(12) United States Patent
Wieczorek et al.

(10) Patent No.: US 7,337,823 B2
(45) Date of Patent: Mar. 4, 2008

(54) EXTENDING END CAP FOR A SECURITY SHADE

(75) Inventors: Joseph P. Wieczorek, Lake Orion, MI (US); Bryan Busha, Grand Blanc, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 295 days.

(21) Appl. No.: 11/066,707

(22) Filed: Feb. 26, 2005

(65) Prior Publication Data

US 2006/0191645 A1 Aug. 31, 2006

(51) Int. Cl.
*E06B 9/08* (2006.01)
(52) U.S. Cl. .................... 160/24; 160/323.1; 296/37.16
(58) Field of Classification Search ............... 160/23.1, 160/24, 21, 263, 323.1, 370.22, 318, 313, 160/324; 296/37.16; 242/599.3; 248/262; 211/105.3
See application file for complete search history.

(56) References Cited

U.S. PATENT DOCUMENTS

| | | | |
|---|---|---|---|
| 766,541 A | 8/1904 | Spiegle | |
| 1,736,527 A * | 11/1929 | Garcia | .......................... 160/21 |
| 1,950,927 A | 3/1934 | McMillan | |
| 2,248,538 A | 7/1941 | Liebler | |
| 2,605,987 A * | 8/1952 | Brown et al. | ................ 248/408 |
| 2,848,273 A | 8/1958 | Diaz | |
| 2,867,471 A | 1/1959 | Coon | |
| 3,004,790 A | 10/1961 | Mayer | |
| 3,181,911 A | 5/1965 | Peras | |
| 4,127,301 A | 11/1978 | Syrowik | |
| 4,138,154 A | 2/1979 | McKeon | |
| 4,139,231 A | 2/1979 | Lang et al. | |
| 4,168,094 A | 9/1979 | Yagi | |
| 4,202,578 A | 5/1980 | Roullier | |
| 4,222,601 A | 9/1980 | White et al. | |
| 4,399,857 A * | 8/1983 | Honma | ..................... 160/323.1 |
| 4,479,677 A | 10/1984 | Gulette et al. | |
| 4,480,675 A | 11/1984 | Berkemeier | |
| 4,502,674 A | 3/1985 | White et al. | |
| 4,536,025 A | 8/1985 | Yamawaki | |
| 4,596,418 A | 6/1986 | Koh | |
| 4,668,001 A | 5/1987 | Okumura et al. | |
| 4,671,557 A * | 6/1987 | Lemp | ...................... 296/37.16 |
| 4,776,625 A | 10/1988 | Lobanoff et al. | |
| 4,781,234 A | 11/1988 | Okumura et al. | |
| 4,783,113 A | 11/1988 | Padlo | |
| 4,927,200 A | 5/1990 | Wilkins | |
| 4,932,704 A | 6/1990 | Ament | |
| 5,031,682 A | 7/1991 | Tedeschi | |
| 5,040,843 A | 8/1991 | Russell et al. | |
| 5,050,923 A | 9/1991 | Petelka | |
| 5,213,387 A | 5/1993 | Decker et al. | |

(Continued)

FOREIGN PATENT DOCUMENTS

JP 34446 5/1990

*Primary Examiner*—Blair M. Johnson
(74) *Attorney, Agent, or Firm*—Raggio & Dinnin, P.C.

(57) ABSTRACT

A support mechanism for a vehicle security shade having one or more axially biased end caps and at least one end cap extension slidingly disposed upon an end cap to adjust the length of the security cover assembly. The end cap has a resilient latch which engages mating recesses in the extension to fix the length of the shade as desired.

4 Claims, 3 Drawing Sheets

U.S. PATENT DOCUMENTS

| | | |
|---|---|---|
| 5,224,748 A | 7/1993 | Decker |
| 5,464,052 A | 11/1995 | Wieczorek et al. |
| 5,813,449 A | 9/1998 | Patmore et al. |
| 5,934,354 A | 8/1999 | Price et al. |
| 5,947,358 A | 9/1999 | Wieczorek |
| 7,201,417 B2 * | 4/2007 | Teo ................ 296/24.4 |

* cited by examiner

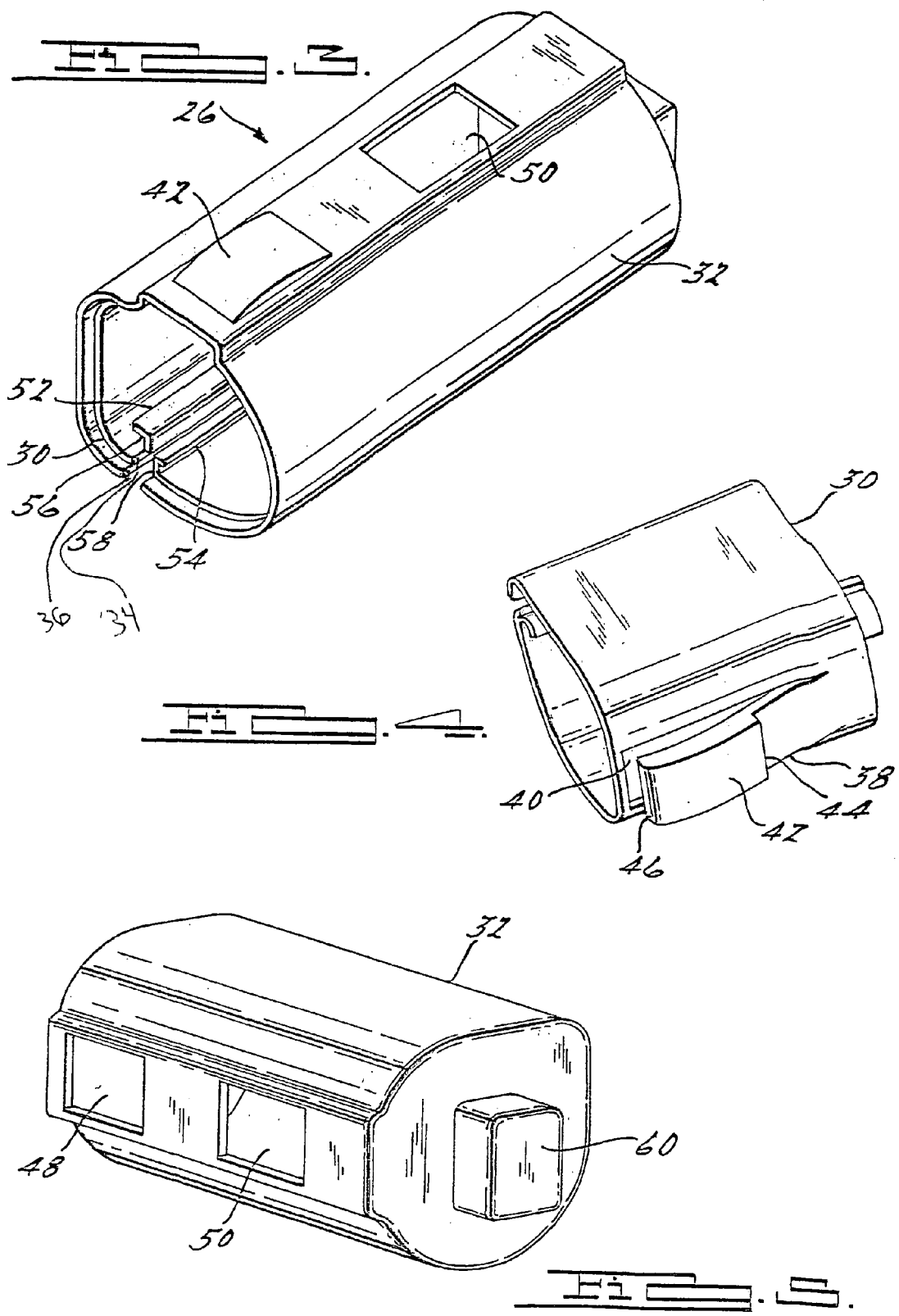

EXTENDING END CAP FOR A SECURITY SHADE

TECHNICAL FIELD

The present invention relates generally to vehicular retractable security covers assemblies and more particularly to the devices that allow such assemblies to be mounted in vehicles.

BACKGROUND OF THE INVENTION

Security covers, tie downs and nets have been used in vehicles for decades to hide and stabilize the contents of cargo areas of vehicles. Covers or shades particularly are used to obscure the visibility of the contents of cargo areas, which are visible from outside the vehicle. An example is the cargo space of a Sports Utility Vehicle (SUV) wherein the cargo area is typically most visible through the rear windows behind the C pillar (the pillar typically located at the back of the second row seats) or the rear window.

Retractable shades are drawn over the cargo area to obscure at a level below the bottom of the windows and typically somewhat below the highest extent of the second row seats when in the upright position. In many designs it is difficult to gain access to items under the cover without opening the rear of the vehicle.

When retracted the shades are wrapped on a tube which is coiled by a spring. When extended the shades are pulled against this spring tension to the another interior panel of the vehicle where the shade is temporarily attached by means of clips, snaps, detents and the like. To aide in extension and retraction as well as to provide stiffness, shades likely have handles and/or bars/tubes sewn or molded into the edge that is pulled from the roller tube to another interior panel. Security shades are mounted to be drawn transversely or in the cross-vehicle direction, or they may be mounted to be drawn longitudinally, typically from fore to aft in the vehicle.

The roller tube assemblies are sometimes intended to be removable from the vehicle. The roller tube assembly may be compressed axially against a resisting force such as a coil spring and then released into mounting fixtures integral to the interior side panel of the vehicle. These fixtures may comprise detents or depressions that the roller assembly expands into. Means to rotate the roller assembly to afford release are sometimes provided.

U.S. Pat. No. 5,213,387, discloses another security roller shade for a cargo area of a vehicle extending from a passenger seat backward to the rear access opening. In the retracted position, the cover is contained in a roller tube mounted longitudinally (fore and aft direction) on one side of the cargo compartment. The shade may be unwrapped from the tube and extended laterally in the cross-body direction to be affixed on the other side of the cargo compartment.

U.S. Pat. No. 5,464,052, the disclosure of which is incorporated herein by reference, discloses a mounting which can be rotated relative to the roller tube and moved axially toward and away from the roller tube to allow mounting in a vehicle. The subassembly contains a means to rotate the roller to wrap up the shade. This patent further discloses a torsion motor spring to maintain the spring in a pre-wound condition prior to engagement of the subassembly to the roller tube. A trim cover axially larger than the rolled-up roller tube covers the roller tube except for a longitudinal slit through which the shade is wrapped and unwrapped.

U.S. Pat. No. 5,676,415 discloses a luggage compartment cover with a bearing shaft, which supports a flat structure that can be rolled and unrolled. The bearing shaft extends between two bucket-shaped side parts. At least one of the side parts is movable axially relative to the bearing shaft so the cover to allow it to be released from in a first position or placed into a mount which is integral to the vehicle in a second position relative axially to the bearing shaft. At least one of the side parts has a releasable lock for locking its side part in the released position.

U.S. Pat. No. 5,813,449, the disclosure of which is incorporated herein by reference, discloses a compression loaded end cap for a security shade with a pawl and tooth engagement mechanism allows the end cap to be latched in a plurality of relative axial positions which allows the entire shade assembly to be mounted despite variations in distance between mounts.

U.S. Pat. No. 5,934,354, the disclosure of which is incorporated herein by reference, discloses axially spring biased end caps which may be compressed to be installed within a vehicle, and provide the secure installation force via the outwardly biased end caps.

U.S. Pat. No. 6,039,105 the disclosure of which is also incorporated by reference, illustrates another method of adjusting the lateral positioning and tensioning of a roller shade. The mounting pockets in the vehicle provide the compressible leeway for the shade when installed.

A general purpose of adjustable length shade rollers has been to provide a means of installing the shade roller in detented or recessed mounts and secured in place without significant movement or rattle despite spacing variations between the mounting brackets due to build or tolerance variations.

Although roller shades are extremely useful, they are typically removable. For example, roller shades are typically installed behind the rear seats of an SUV, and are removed when the rear seats are folded to enlarge the cargo space. When removed from its installed position, a roller shade is somewhat awkward to stow, as they are relatively bulky and tend to rattle if not secured. In at least some vehicles, there is room underneath the surface of the cargo area to stow a shade roller, but the space is typically not large enough to accommodate the full length of a standard shade roller.

Thus, an object of the present invention is to provide a shade roller that can be securely stowed in a reduced length and can still be securely installed in a vehicle.

It is a particular object to provide an end cap for vehicle security shade roller assemblies that is compressible to facilitate secure mounting within a vehicle and also provides a simple way to shorten the roller tube assembly to fit within a reduced storage area within the vehicle with the same compressibility to allow for secure stowage.

It is a further object of the present invention to provide a plurality of easily manufactured extension pieces which can be used to adapt a roller shade for a variety of vehicles or models.

SUMMARY OF THE INVENTION

An end cap assembly for vehicle security shade roller assemblies that consist of a molded end cap and an extension sleeve. The end cap assembly is extended by simply sliding the sleeve in or out relative to the longitudinal axis of the roller. The end cap is held in place by a biased latch in the end cap that engages one of a plurality of mating holes in the extension sleeve. The extension sleeve (or sleeves) allow the shade roller to have a reduced width storage condition and an extended condition for mounting and use in a vehicle.

BRIEF DESCRIPTION OF THE DRAWINGS

FIG. 3 is a left/top perspective view of an end cap assembly of FIG. 2 in the extended/installation position.

FIG. 4 is a bottom/left perspective view of the end cap of FIG. 2.

FIG. 5 is a bottom/left perspective view of the end cap extension of FIG. 2.

DETAILED DESCRIPTION OF THE PREFERRED EMBODIMENT

The following description of the preferred embodiment is merely exemplary in nature and is in no way intended to limit the invention or its application or uses.

Figure 1:
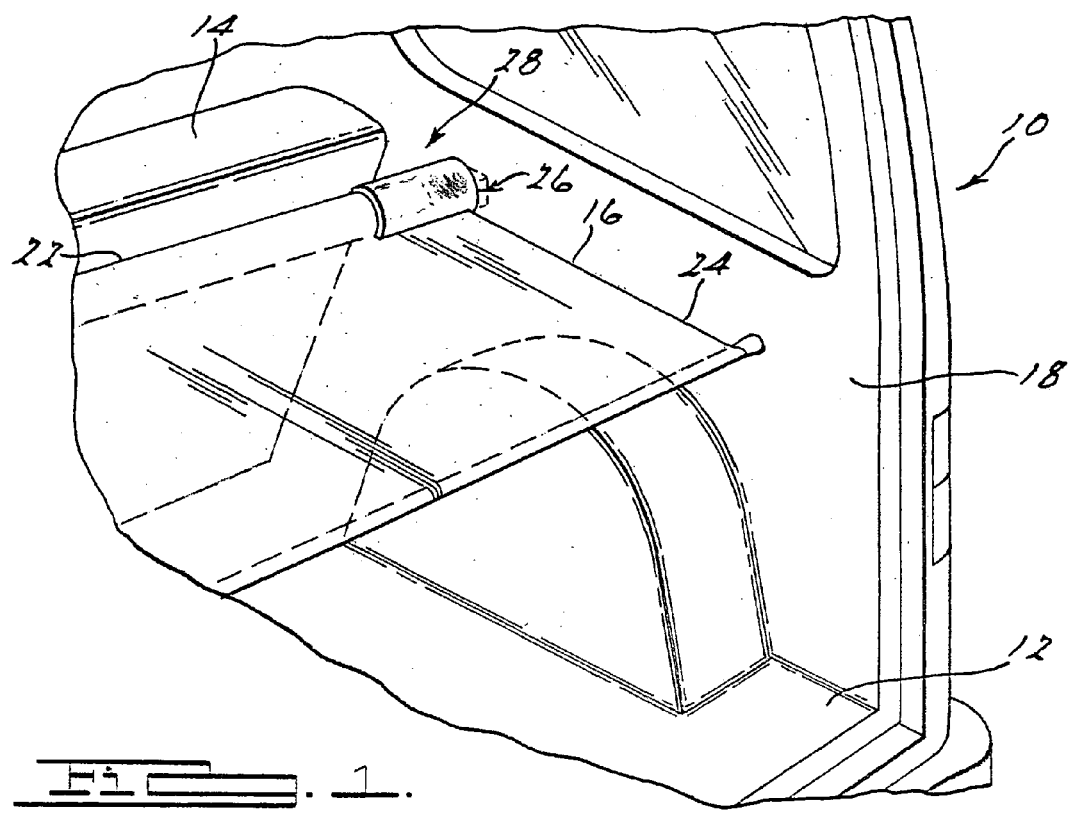
FIG. 1 is a perspective view of a vehicle security shade assembly according to the present invention installed in a vehicle.

FIG. 1 illustrates a vehicle 10 having a cargo area generally indicated at 12. Cargo area 12 is generally defined as extending from behind rear seat 14 to the rear interior surface (not shown) of vehicle 10. Cargo shade 16 is shown extending from the rear seat to the rear of the vehicle and generally covers the cargo area from one inner panel 18 to an opposite inner panel (not shown). As generally illustrated in FIG. 1 and described in more detail in U.S. Pat. No. 5,934,354 cargo shade 16 preferably includes a generally non-compressible roller tube 22, a shade panel 24 wound about roller tube 22, and an end cap assembly 26 located on a first end 28 of roller tube 22. A rotational biasing mechanism is positioned within end cap 26 and acting on first end 28 of roller tube 22. A wide variety of rotational biasing mechanisms are presently known in the art which would function with equal results as related to the present application. Rotationally biasing mechanisms which could be used include motor springs, clock springs, torsional springs, or other similar devices.

The present invention may also be implemented with a roller shade with fixed end caps and floating mounting brackets such as described in U.S. Pat. No. 6,039,105 as generally described herein.

Figure 2:
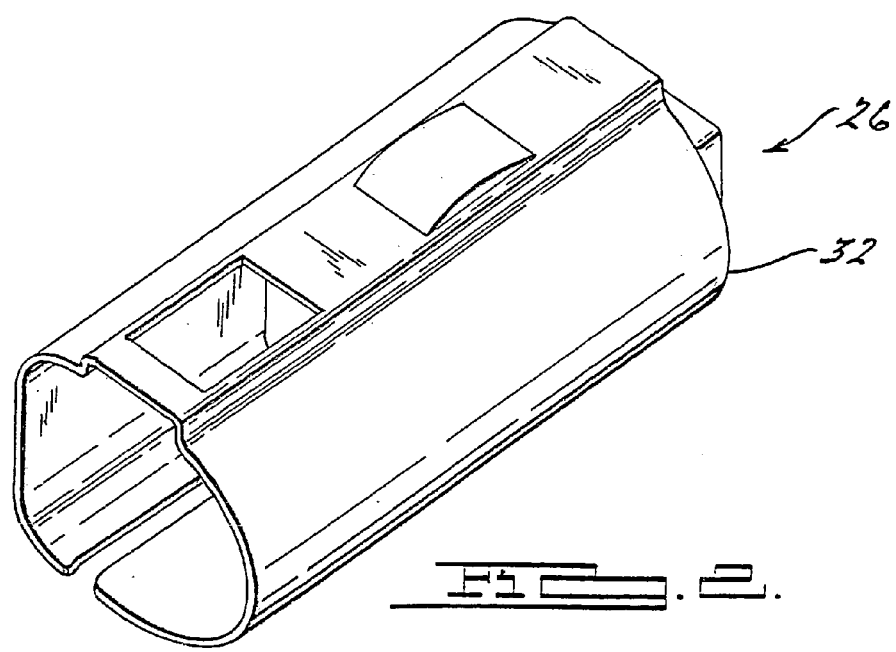
FIG. 2 is a left/top perspective view of an end cap assembly in the storage position according to the present invention.

FIG. 2 illustrates an end cap assembly 26 according to the present invention in the storage position. The end cap assembly 26 includes an end cap 30 slidingly received within an end cap extension 32. The end cap 30 and end cap extension 32 are preferably molded plastic parts and are shaped to nest along the length of travel between the two so that the access slots 34 and 36 are aligned along the length of travel. The end cap 30 is preferably fixed to the shade roller as described in U.S. Pat. No. 5,934,354 so that is axially biased outward from the roller by spring 35, FIG. 6, for installation in the vehicle or for storage in the vehicle. The end cap extension is fixed in position by means of a finger latch 38 integrally molded on the end cap 30 radially above an opening 40 which allows the latch 38 to travel radially inwardly to disengage the latch.

Tab 42 of latch 38 has vertical surfaces 44 and 46 which engage the axial ends of locking slots 48 and 50 in the end cap extension 32 to restrict relative axial movement between the end cap 30 and the end cap extension 32. When the roller shade 16 is installed in the vehicle or in its storage position, the end cap extension 32 will be restricted from outward axial movement by the vehicle bracket or stowage bracket, and the end cap will be axially outwardly biased, forcing the surface 44 against the axial outward edge of either slot 48 or slot 50, reducing or eliminating any axial play between the end cap 30 and the extension 32 whether in the storage length or installation length.

In installation as described in U.S. Pat. No. 6,039,105, the bracket will bias the extension 32 axially inwardly, causing surface 46 of the latch to bear against the axial inward edge of either slot 48 or slot 50, providing the same securing force in the storage length or installation length.

Assembly is simply achieved by sliding the extension 32 over the end cap 30 and depressing the latch 38 so it clears the axially inward edge of the extension 32. The extension 32 is easily reciprocated between the storage length (FIG. 2) and the installation length (FIG. 3) by depressing the latch 38 to disengage the latch 38 from the slot 48 or 50 and sliding the extension to the desired location. Because the latch 38 is resilient, it is biased to return to its radially extended position and will engage a slot 48 or 50 when the extension 32 is moved into position.

As seen in FIGS. 3 and 4, the end cap 30 has a pair of C-shaped edges 52 and 54 forming the access slot 36, which provides a pair of generally flat radially extending surface 56 and 58 to support and guide the shade material as it is dispensed and retracted to minimize wear on the material and reduce sound made when the material rubs against an exposed edge. It is preferred that the width of slot 36 is smaller than slot 34 too minimize contact of the shade material against an edge of slot 34.

The end cap extension 32 is provided with bracket engaging boss 60 at its axially outward end (FIG. 5) for insertion into a mating installation bracket (not shown) or a similarly shaped mating storage bracket (not shown). The bracket engaging configuration of FIG. 5 is a preferred shape, but is should be appreciated that the invention can be implemented with a wide range of locking engagement between the end cap extension and brackets. Further, while it is preferred that the storage brackets and installation brackets be identified to reduce the number of different molded parts, the stowage brackets need merely hold the shade roller in place.

While it is anticipated that one extension end cap shown will provide the necessary length adjustment (approximately _____ inches), with a single latching mechanism to be operated, it should be appreciated that the extension may be longer than shown to provide greater length adjustment or that two end cap extensions may be used.

Figure 6:
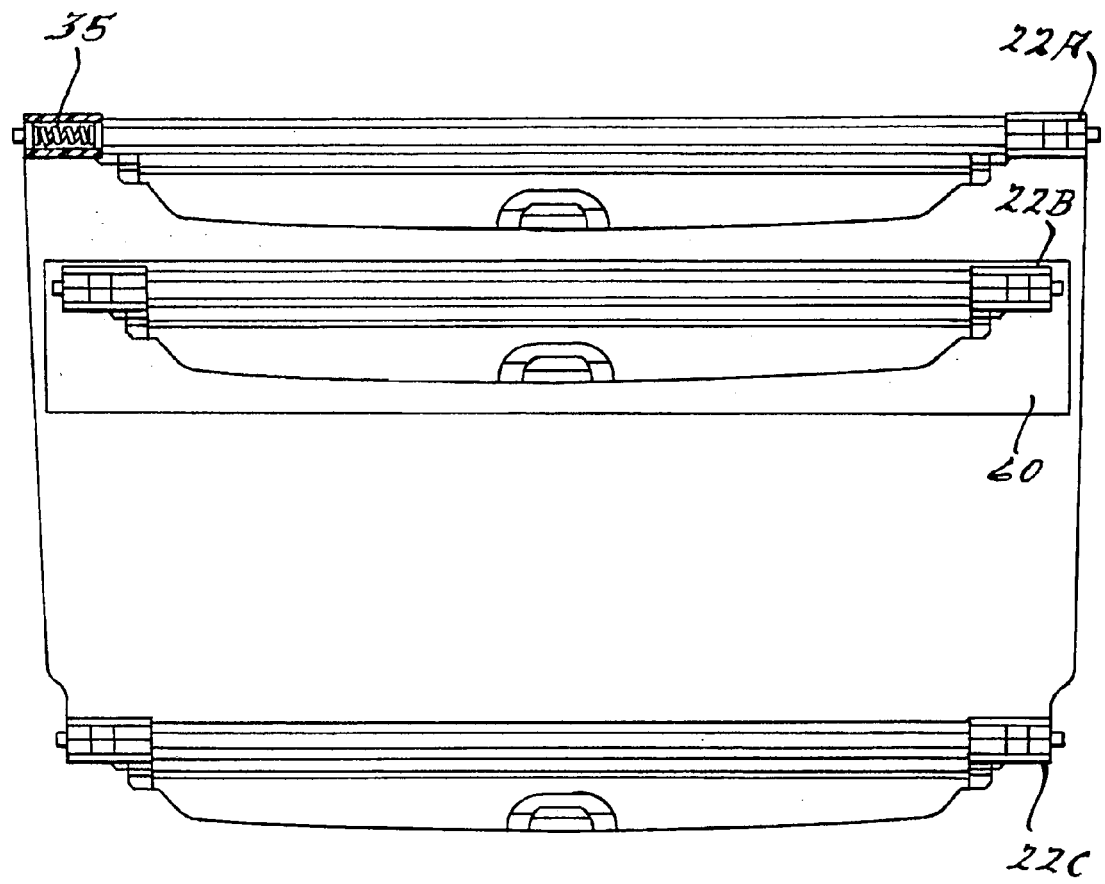
FIG. 6 is a perspective view of a vehicle security shade assembly according to the present invention installed in three alternate locations in a vehicle.

It should also be appreciated that more than two locking slots may be provided in the extension to provide for multiple installation locations within the vehicle having varying widths (for example: alternative high or low mounting locations, or (for alternative) mounting behind the second or third row of seats) or even installations between different vehicles. FIG. 6 illustrates three alternate installation locations for the shade roller, each requiring a different shade width. The roller 22A is installed in the standard location behind the rear seats, typically the widest trim location available. Roller 22B is located in a storage bin 60, in the most reduced condition. Roller 22C is installed in a reduced trim width location.

Another embodiment of the present invention is to provide an end cap extension 32 which is configured to adapt a standard roller shade to a particular vehicle or vehicle module. The roller shade 16 and end cap assembly 26 illustrated in FIGS. 1-5 do not necessarily depict any particular shade model. Vehicle models typically vary in interior dimensions, which would make it impractical to utilize a particular shade in different vehicle models. However, as there are general groups of sizes of cargo area widths, the end cap extension of the present invention may be used to modify a shade of a standard length to fit within a variety of vehicles within a given group of sizes. The use of the extensions may cause an inch or two gap between the deployed shade and interior vehicle side panel, but cargo coverage would still be achieved. Thus, the length of the specific extension 32 can be determined on a vehicle by vehicle basis, and the roller shade can be made in one or two standard lengths and yet accommodate a variety of vehicles by use of the appropriate extension.

What is claimed is:

1. A vehicle security shade, comprising:

a roller assembly;

an end cap resiliently carried on an end of said roller assembly, said end cap being biased axially onwardly on said roller assembly, said end cap having a radially outwardly biased latch;

an end cap extension longitudinally slides over the end cap between a reduced storage position and an extended position and having a plurality of axially spaced apertures for receiving said latch.

2. The vehicle security shade support apparatus of claim 1, wherein said latch is integrally molded with the end cap.

3. A vehicle security shade, comprising:

a roller assembly;

an end cap resiliently carried on an end of said roller assembly, said end cap having a radially outwardly biased latch;

an end cap extension longitudinally slides over the end cap between a reduced storage position and an extended position and having a plurality of axially spaced apertures for receiving said latch.

4. A vehicle security shade, comprising:

a roller assembly;

an end cap resiliently carried on an end of said roller assembly, said end cap having a radially outwardly biased latch;

an end cap extension longitudinally slides over the end cap and having an aperture for receiving said latch.

* * * * *

UNITED STATES PATENT AND TRADEMARK OFFICE
CERTIFICATE OF CORRECTION

PATENT NO. : 7,337,823 B2 Page 1 of 1
APPLICATION NO. : 11/066707
DATED : March 4, 2008
INVENTOR(S) : Joseph P. Wieczorek et al.

It is certified that error appears in the above-identified patent and that said Letters Patent is hereby corrected as shown below:

Col. 3, Line 61 - Please insert -- it -- after "U.S. Pat. No. 5,934,354 so that"

Signed and Sealed this

Twenty-ninth Day of July, 2008

JON W. DUDAS
*Director of the United States Patent and Trademark Office*